United States Patent [19]

Gill

[11] Patent Number: 5,163,331

[45] Date of Patent: Nov. 17, 1992

[54] SPEED MEASUREMENT DEVICE

[75] Inventor: Michael J. Gill, Milford-on-Sea, England

[73] Assignee: British Gas plc, London, England

[21] Appl. No.: 363,994

[22] Filed: Jun. 9, 1989

[30] Foreign Application Priority Data

Jun. 9, 1988 [GB] United Kingdom ............... 8813640

[51] Int. Cl.⁵ .............................................. G01F 1/66
[52] U.S. Cl. .............................................. 73/861.28
[58] Field of Search ........... 73/861.27, 861.28, 861.29, 73/597; 374/119

[56] References Cited

U.S. PATENT DOCUMENTS

| | | | |
|---|---|---|---|
| 3,788,140 | 1/1974 | Turtle | 73/861.28 |
| 3,964,309 | 6/1976 | Husse et al. | 73/861.28 |
| 4,104,915 | 8/1978 | Husse | 73/118.2 X |
| 4,140,012 | 2/1979 | Hendriks | 73/861.27 |
| 4,325,262 | 4/1982 | Meisser et al. | 73/861.28 |
| 4,630,482 | 12/1986 | Traina | 73/861.28 X |
| 4,787,252 | 11/1988 | Jacobson et al. | 73/861.28 |

FOREIGN PATENT DOCUMENTS 0124028  9/1981  Japan ................... 374/119

Primary Examiner—Charles A. Ruehl
Attorney, Agent, or Firm—Oblon, Spivak, McClelland, Maier & Neustadt

[57] ABSTRACT

A fluid speed measurement device includes a pair of ultrasonic transducer T1,T2 spaced in a measuring chamber. A transmitter and receiver system is controlled by a microprocessor 100 which generates pulses which periodically invert and these are switched by switches 140,150 to allow alternate direction of transmission. Reception and detection of signals is effected by blocks 152-168. Time calculation is determined by counter 109 and results are used to calculate flow speed or volume using the microprocessor. A speed increase in the measurement region is effected using a venturi device.

32 Claims, 13 Drawing Sheets $t_1$ $t_2$

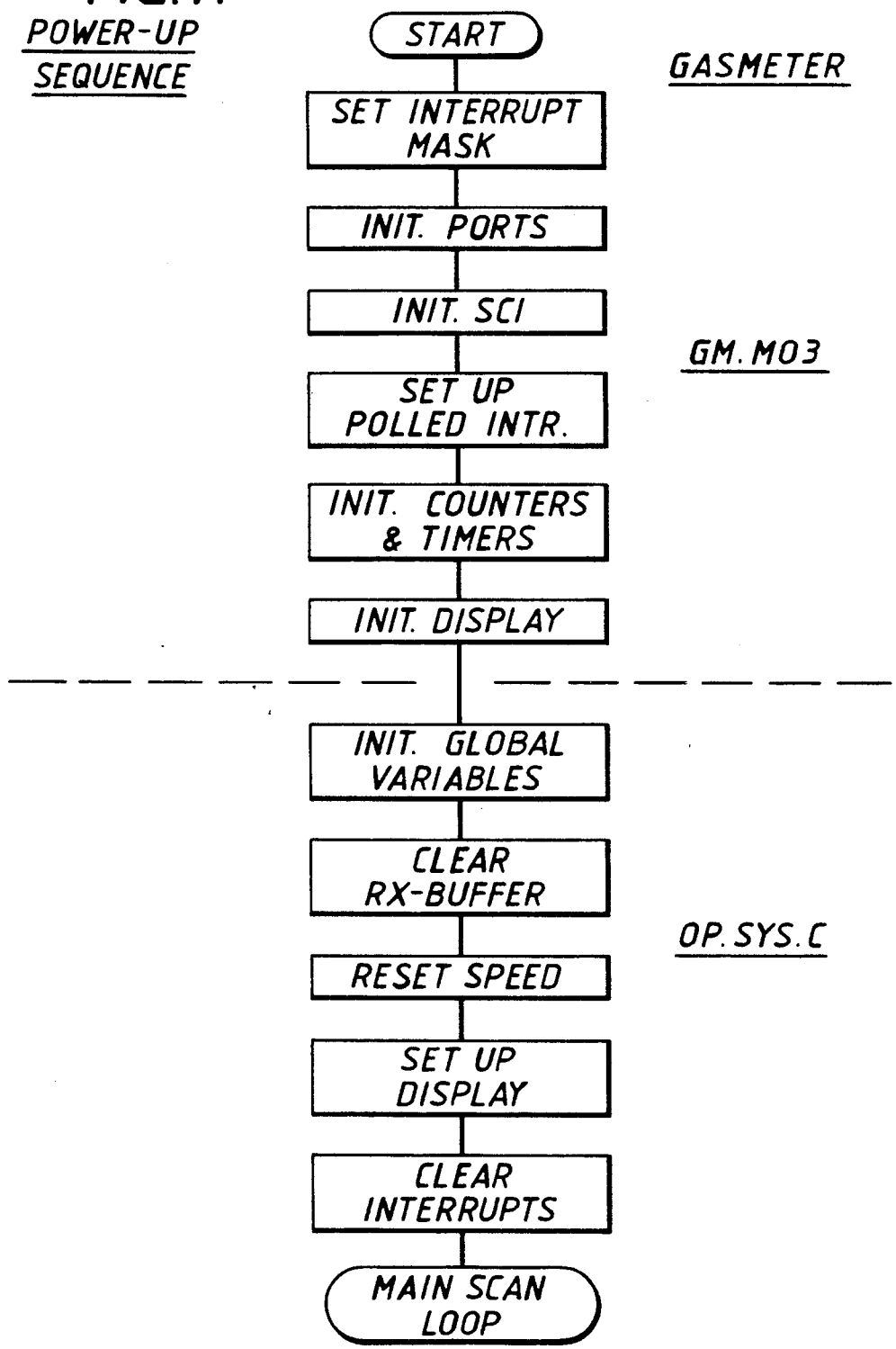

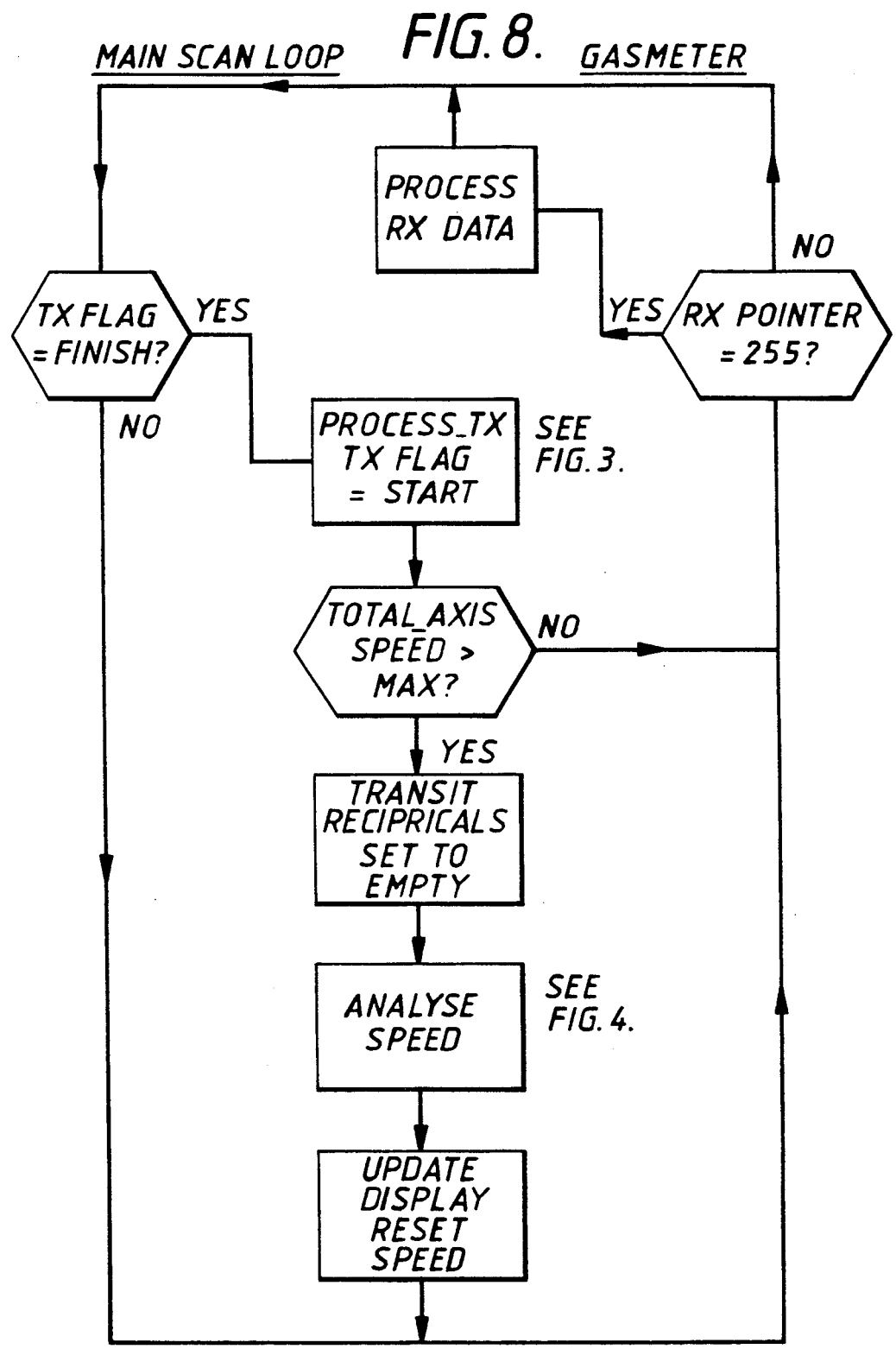

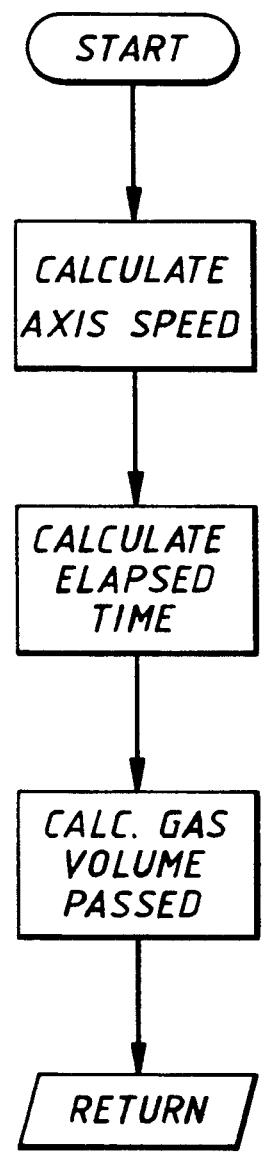

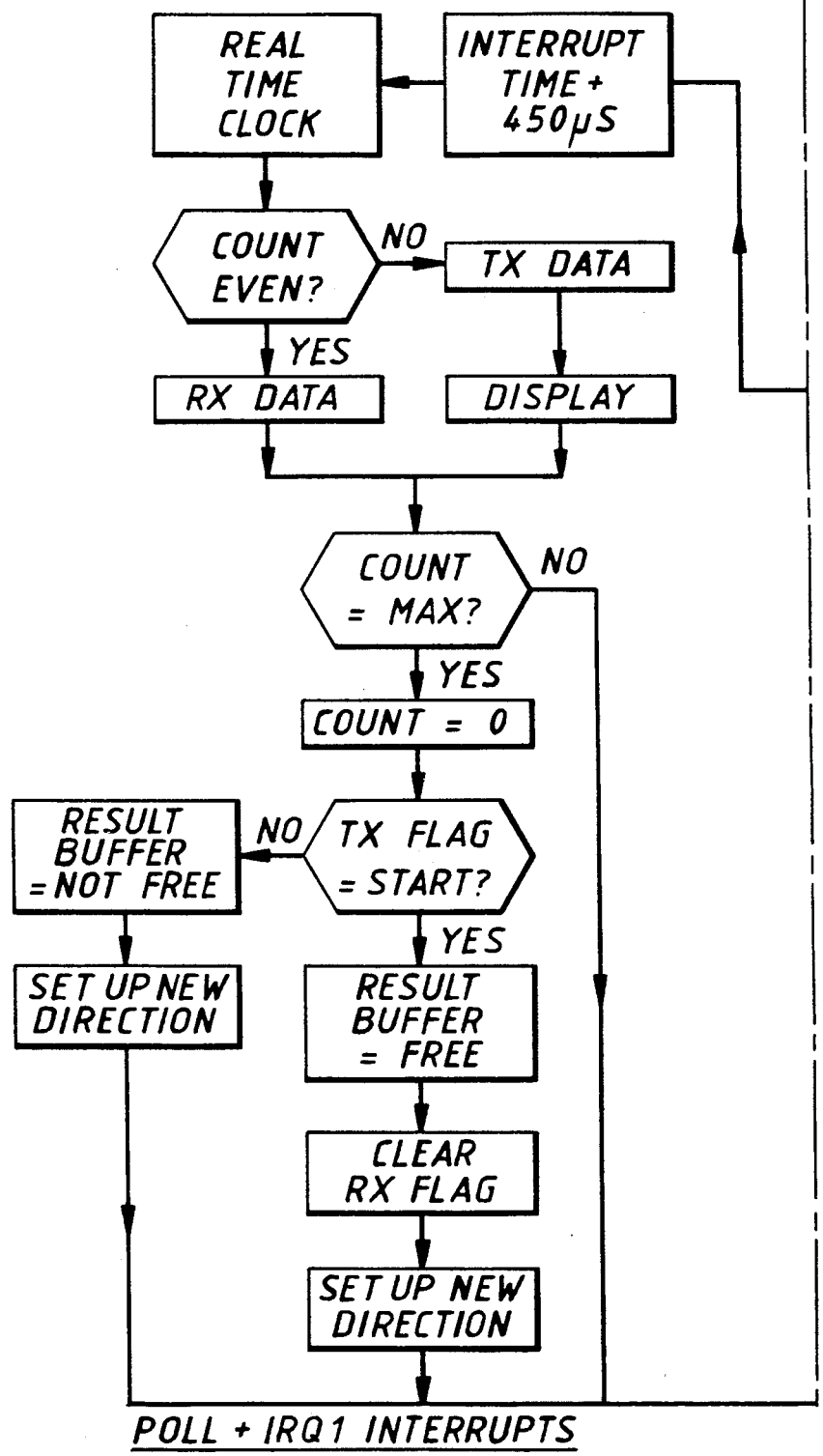

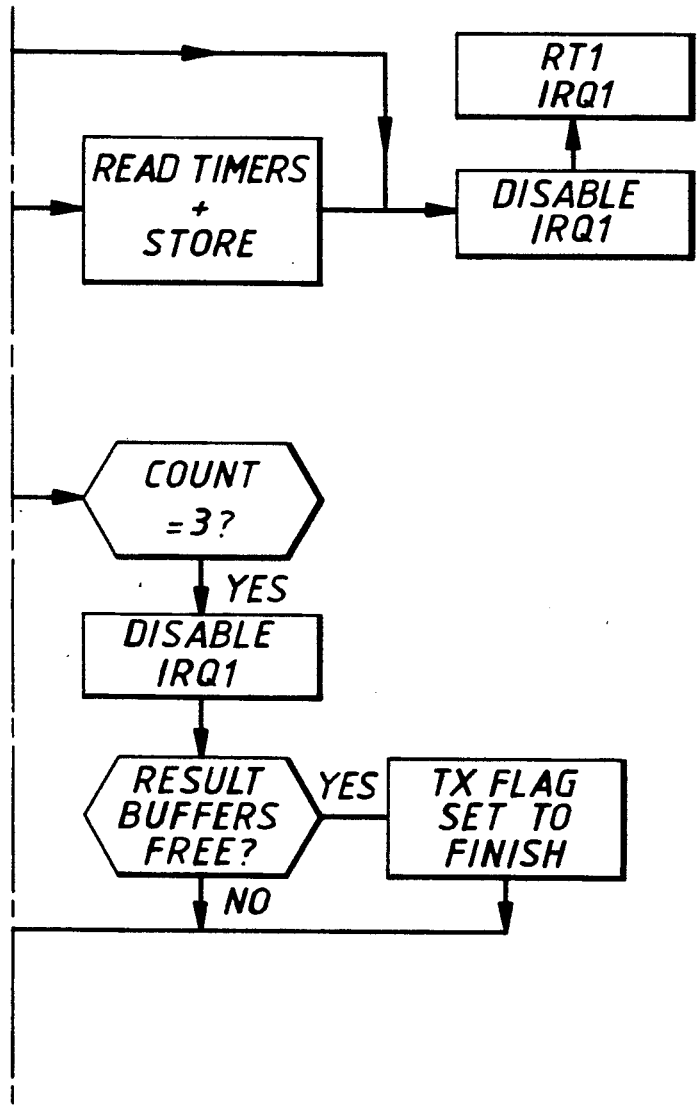

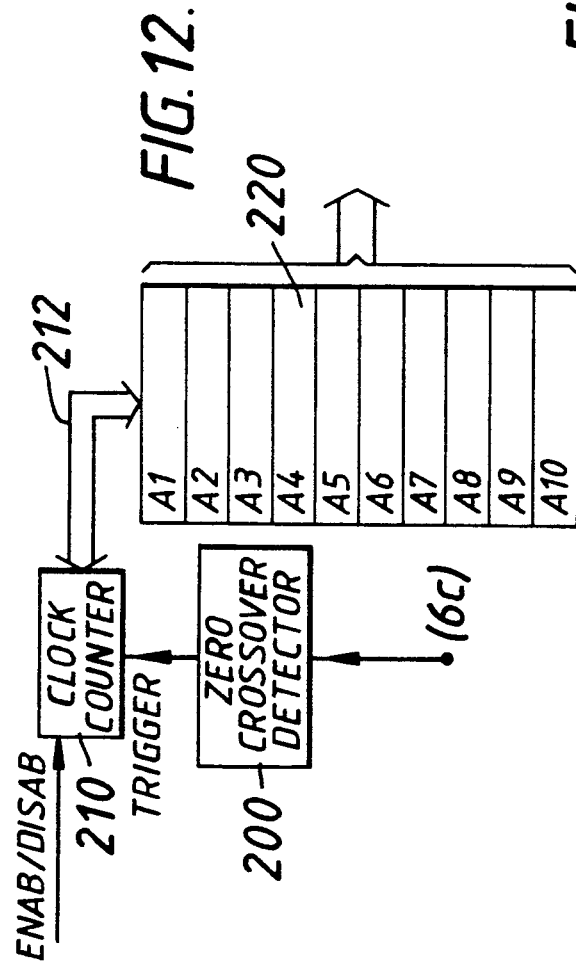

SPEED MEASUREMENT DEVICE

Speed measurement devices have been proposed which measure the speed of a liquid relative to the device by measuring the time of flight of an acoustic signal in both directions between first and second transducers and deriving, from the times of flight, the relative speed of the liquid. Such devices have been proposed for, inter alia, measuring the speed of a ship through the water (e.g. as described in U.S. Pat. No. 3,898,878) or measuring the flow rate of liquid in a pipe (e.g. as described in U.S. Pat. No. 3,329,017).

The inventor has found that it is a disadvantage of such devices that they are limited to use with liquids and are not suitable for measuring the flow speed of gases due, primarily, to the use, in such devices, of amplitude-based detection of the received signal. In gases, amplitude variations in the acoustic signal can be large, leading to ambiguity in the time of arrival of a transmitted pulse at the receiving transducer and thus to inaccuracy.

It is an object of the invention to provide an acoustic speed measurement device for measuring the flow speed of gases.

According to the invention in a first aspect there is provided a fluid speed measuring apparatus comprising first and second spaced transducer means, transmitter and receiver means for transmitting and receiving signals in both directions between the transducer means, the transmitter means being arranged to generate a tone burst signal, which signal includes a phase change and the receiver means is arranged to sense the phase change to provide a timing marker for the received signal.

According to the invention in a second aspect there is provided a method of measuring fluid speed comprising generating a tone burst signal which includes a phase change, transmitting and receiving the signal in both directions between spaced transducers in a fluid path and sensing the phase change in the received signal to provide a timing marker for the received signal.

According to the invention in a third aspect there is provided an apparatus for measuring the volume flow of a fluid flowing in a pipe comprising first and second transducer means disposed in the pipe and spaced one from the other to define an acoustic path therebetween, the first and second transducer means being arranged to transmit and receive acoustic signals in both directions along the acoustic path; and means arranged to increase the flow speed of the fluid in the pipe in the region of and along the acoustic path.

The embodiment of the invention, by measuring gas speed through a passage of known dimensions, provides a measurement of volume flow and thus is applicable for use as a meter, particularly a household gas meter.

An embodiment of the invention will now be described, by way of example, with reference to the accompanying drawings in which:

FIGS. 7 to 10 and 11a to 11c are flow sheets of the various operations involved in the calculation of flow speed, FIG. 12 shows a first modification to the circuit of FIG. 3.

FIG. 13 shows a second modification to the circuit of FIG. 3.

The embodiment of the speed measurement device shown in the figures is configured as a gas meter which works on a similar basic principle to the prior art referred to at the start of this specification, namely that the times of flight of acoustic signals transmitted in both directions between two receiver/transmitter transducers are used to derive the flow speed of fluid flowing between the transducers. The fluid flows through a passage of known dimensions and the flow speed information is used to indicate volume flow and thus meter the gas flowing through the passage.

Figure 1:
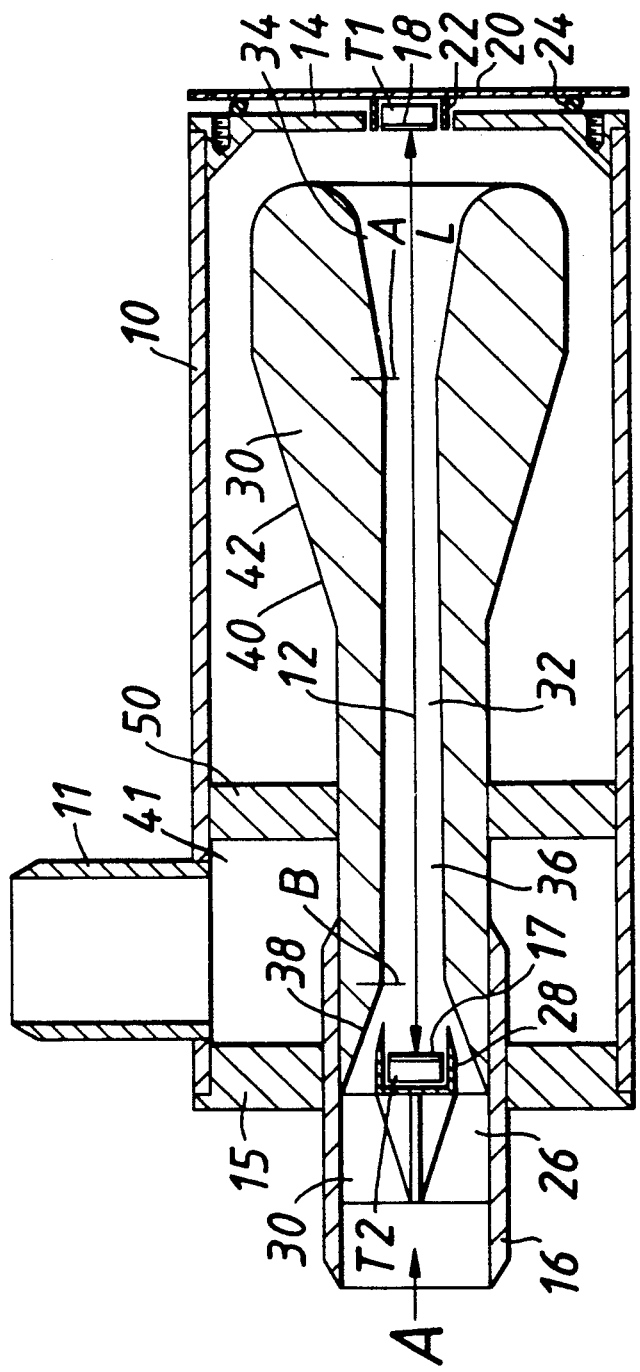
FIG. 1 is a sectional view of an embodiment of the invention, configured as a gas meter.
Figure 2:
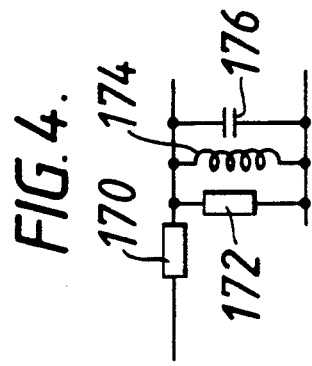
FIG. 2 is a view taken in the direction of the arrow A in FIG. 1.

The mechanical arrangement of the described embodiment is shown in FIGS. 1 and 2 and includes a housing comprising a cylindrical pipe or duct 10 having end caps 14, 15; a cylindrical inlet pipe 11 normal to the axis of pipe 10 and an outlet pipe 16 connected to end cap 15 and mounted co-axial with pipe 10.

First and second piezo-ceramic transducers T1, T2, provided with faces 17, 18 formed from a material of, for example silicone rubber to improve the acoustic matching with the gas flowing through the device, are attached to the housing. The transducers T1, T2 can be used for both transmission and sensing of an acoustic signal.

Transducer T1 is connected to a fiberglass mounting member 20 which includes a sleeve 22 for receiving the transducer element. The mounting member is connected to end cap 14 by peripheral screws (not shown) and via a gas impermeable O ring 24.

Transducer T2 is connected to pipe 16 via a mounting member 26 which includes a sleeve 28 in which the transducer T2 is mounted, the sleeve 28 being connected to four wings 29 which are attached to the inside of pipe 16 (see FIG. 2).

A flow shaping member 30 is connected to pipe 16 so as to protrude into the pipe 10. The member 30 has a central bore or conduit 32 including a venturi section 34, a measurement section 36, which slightly increases in diameter from points A to B, and a diffuser section 38. The external surface 40 of member 30 together with the inner wall of pipe 10 defines a settling chamber of large diameter 41, provided to allow turbulence in gas entering the housing to decay, and a section of reducing cross sectional area 42 for increasing the gas flow speed.

The shape of the member 30 is as aerodynamically clean as possible to maintain laminar flow. To settle the gas flow further, an annular gauze filter 50 is provided between the outer wall 40 and the inner wall of pipe 10.

The shape of the flow shaping member 30 is such as to accelerate the flow speed up until the point at which the gas enters the measurement section 36, which is shaped to maintain the flow speed and flow rate constant through the section (the slight increase in diameter compensating for viscous effects). This enables one to measure very low gas flow rates very accurately.

The speed measurement device works on the following principle:

Assuming the gas flowing through the meter to have a sound propagation velocity C and to be flowing with velocity V along the common axis of the two transducers T1, T2, spaced apart by a distance L, the time-of-flight of ultrasound pulses between the two transducers in each direction is:

$t1 = L/(C+V)$ ... in the direction from T1 to T2;

$t2 = L/(C-V)$ ... in the direction from T2 to T1.

Inverting and subtracting:

$$V = \tfrac{1}{2}L(1/t2 - 1/t1) \qquad (1)$$

The speed V is related to gas volume flow through the measurement section 32 and thus to the amount of gas used, all other things being equal.

Figure 3:
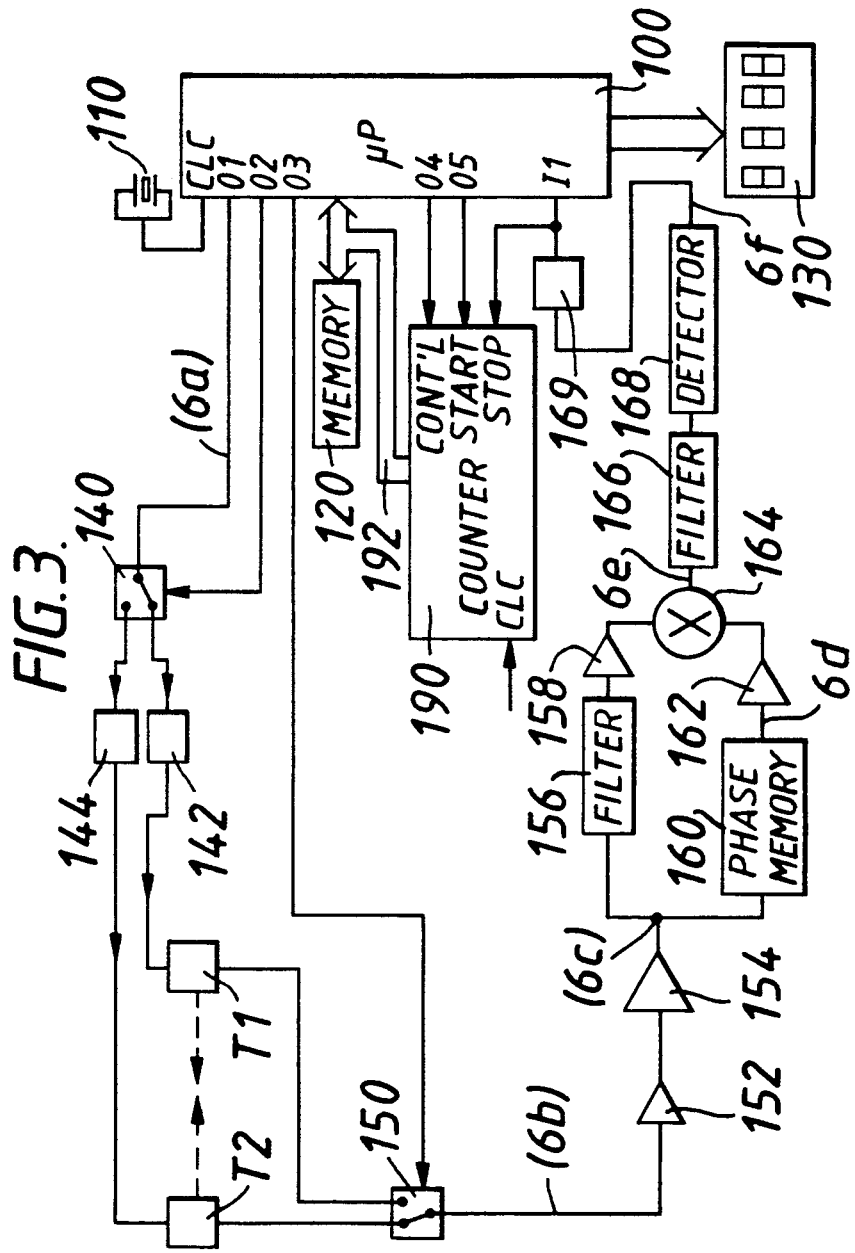
FIG. 3 is a block diagram of the transmission and sensing circuitry of the embodiment of FIGS. 1 and 2.

The transmission and sensing circuitry for measuring the time of flight of signals travelling between transducers T1, T2 is shown in FIG. 3. The circuitry is controlled by means of a micro processor 100 provided with a clock source 110 and RAM/ROM memory 120. The micro processor 100 includes a plurality of input-/output (I/O) lines of which five are configured as output lines (O1-O5) and one is configured as an input line (I1) in this embodiment.

Output line O1 provides a pulsed signal to be transmitted and this signal is fed to a switch 140, the position of which is controlled via output line O2 so that, under control from the micro processor 100, the signal is fed to either transducer T1 or transducer T2 via a respective drive circuit 142, 144, for transmission.

Figure 6A:
FIGS. 6a to 6f are a timing diagram illustrating the operation of the embodiment of FIGS. 1 to 5.

The drive signal from micro processor 100 has the form shown in FIG. 6a and is a square pulse modulated carrier wave or tone burst signal in which a 180° phase inversion has been inserted. This phase inversion provides a timing marker for identification of the received pulse which does not rely on the instantaneous amplitude of the received signal.

Figure 6B:
Figure 6C:
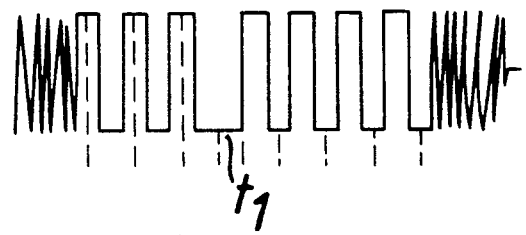

The transducers T1, T2 are connected to a further switch 150 on the receiver side of the circuitry. The position of the switch is controlled via output line O3 so that the receiver circuitry is connected to the transducer which is not selected for transmission by means of switch 140. The output signal from switch 150 (see FIG. 6b) which is displaced in time from the transmitted signal is fed, via a preamplifier 152 to a limiting amplifier 154 which acts to "square" up the received signal (see FIG. 6c). The output from limiting amplifier 154 is then fed to two chains of electronics. The first chain comprises a high pass filter 156 and limiting amplifier 158 and the second chain comprises a phase memory 160 and limiting amplifier 162. The outputs from both chains of electronics are then fed to a synchronous detector 164, for example an exclusive OR gate.

Figure 4:
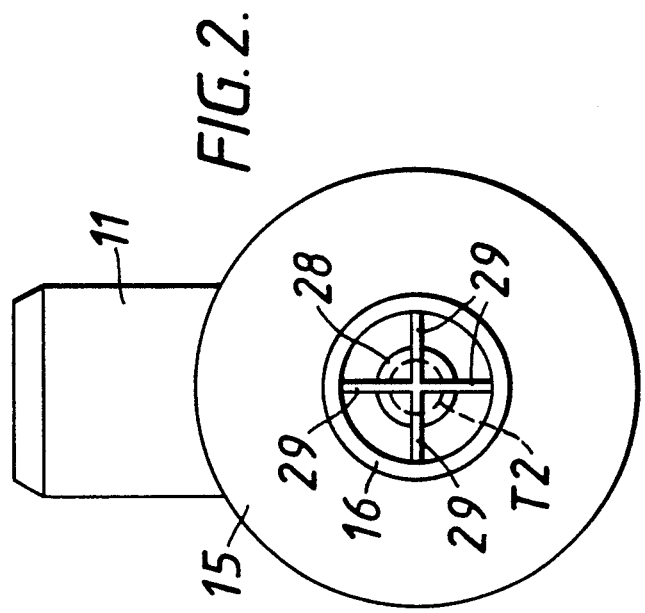
FIG. 4 shows an example of the phase memory circuit of FIG. 3.

The phase memory 160 is a tuned circuit as shown in FIG. 4 and comprises first and second resistors 170, 172, the resistor 172 being disposed in parallel with an inductor 174 and a capacitor 176. The values of elements 170-176 are chosen so that the circuit is tuned to the same frequency as the transmitted signal and the circuit has the effect of outputting a signal of the same phase characteristics as the signal input from amplifier 154 but shifted in time by a time delay related to the time constant of the circuit 170-176 (see FIG. 6d). The transmitted pulse frequencies are in the range 100 KHz to 300 KHz.

The synchronous detector 164 will produce a low output when the signals input to it are in-phase and a high output when the signals input to it are out-of-phase. The delaying of the signal from amplifier 154 by phase memory 160 results in the phase reversal in the received signal to be also delayed. This results in periods in which the signals from amplifiers 158, 162 are in-phase and out-of-phase, with the signals becoming out-of-phase exactly at the point of phase reversal of the signal from amplifier 158. This change of state of the synchronous detector 164 provides a highly accurate timing marker for the received signal (see FIG. 6e).

The output from synchronous detector 164 is input, via a further filter 166, to a detector 168 which detects this change of state.

Figure 5:
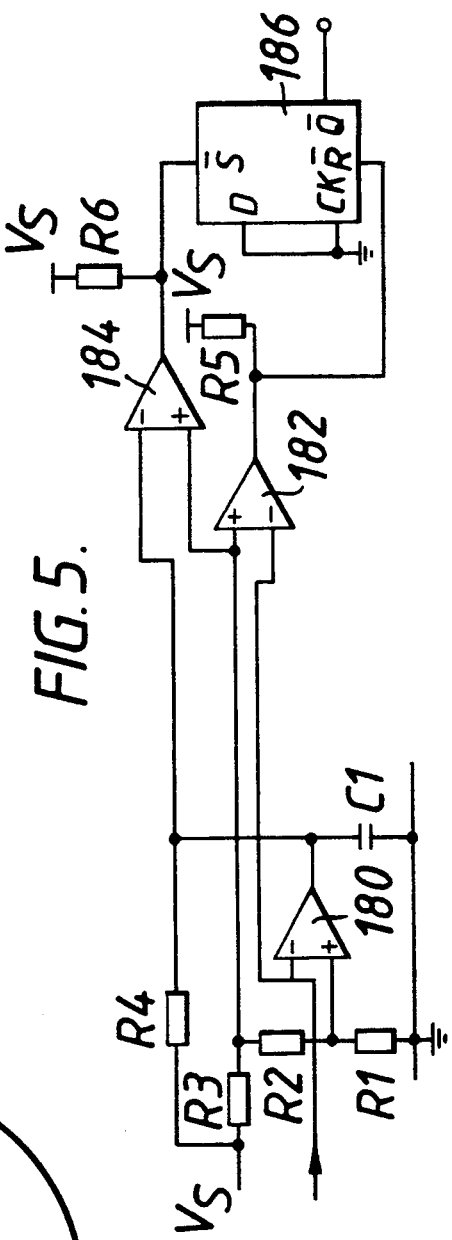
FIG. 5 shows an example of the detector circuit of FIG. 3.

The detector 168 is shown in detail in FIG. 5 and comprises three comparators 180, 182, 184 with different threshold levels connected to a D type flip flop configured as a set reset bistable.

Comparator 180 receives the signal from filter 166 (referred to as the input signal) at its inverting input and is connected at its non-inverting input to a reference voltage specified by R1, R2 and R3. The reference voltage is arranged to be 25% of the band of excursion of the signal from filter 166. Comparator 180 is of an open collector configuration so as to be connected to ground unless the input signal is less than the threshold set by resistors R1-R3 at which point the comparator output becomes an open circuit and a capacitor C1 then charges from supply VS through resistor R4.

Comparator 184 is set to a threshold level determined by resistor R3 of 50% of the band of excursion of the signal from filter 166 and will have an open circuit output only after the input signal has exceeded the threshold of comparator 180 for a time delay related to the time constant of circuit R4, C1. Should the input signal rise above the threshold of comparator 180 during this time delay C1 is discharged through the shorted output of comparator 180. Circuit R4, C1 thus provides a time delay to ensure that the output signal from filter 166 corresponds to the "silent" in-phase portion of the two processed versions of the received signal input to the synchronous detector 164. Once the threshold of comparator 184 has been reached, the output of the comparator 184 is short circuited and flip flop 186 is set.

The flip flop 186 is reset once the signals from amplifiers 158, 162 are sensed by synchronous detector 164 to be out-of-phase (producing a high input at filter 166) using comparator 182. Comparator 182 is provided with the input signal from filter 166. The same threshold level as is applied to comparator 184 is fed to the non-inverting input of comparator 182 so that the output from comparator 182 will become a short circuit, thus resetting flip flop 186, whenever the signal from filter 166 rises above 50% of its band of excursion. Comparator 182 will act continually to reset flip flop 186 except during the period of in-phase comparison by the synchronous detector 164 (see FIG. 6f).

The output from the detector is connected to an arm and trigger circuit 169 which reacts to the falling level of the output signal from flip flop 186. The output from arm and trigger circuit 169 is then fed to input port I1 of microprocessor 100.

A high speed counter circuit 190, under control of the processor 100, through output line O4, measures the time of flight of the acoustic signal, receiving a count start signal at the time of phase inversion of the transmitted signal (from line O5) and a count stop signal from arm and trigger circuit 169. The transit time information is then fed to processor 100 via bus 192.

Figure 6D:
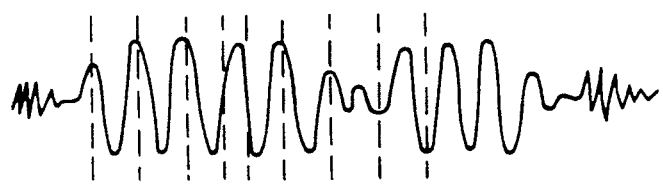
Figure 6E:
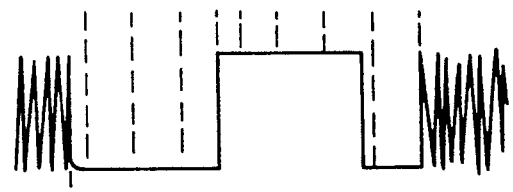

The operation of this circuit is illustrated graphically in which FIG. 6a shows the form of signal output from output port O1 of microprocessor 100. This is transmitted from transducer T1 to transducer T2 and is received by the receiving circuitry, after preamplification, in the form shown in FIG. 6b. The limiting amplifier 154 squares up the signal to that shown in FIG. 6c which is, substantially, in the same form as that transmitted. FIG. 6d shows the signal at the output from phase memory 160 and is squared up by amplifier 162 in which signal 6d has retained the same phase information as signal 6c but has become delayed in time. The output from filter 156 and amplifier 158 is of substantially the same form as that shown in FIG. 6c. FIG. 6e shows the output signal from synchronous detector 164. From inspection of FIG. 6c and 6d it can be seen that these are in phase until time t1, which marks the phase change of signal 6c. At this point, these signals become wholly out-of-phase resulting in the change of state of synchronous detector 164 leading to the high level pulse as shown in FIG. 6e. This out-of-phase relationship lasts until the time delay forced on the signal by the phase memory 160 has worked through and the signals become in-phase again.

Figure 6F:

FIG. 6f illustrates the output of the detector 168. As shown, flip flop 186 is not set until the input signal to the detector 168 has remained low for a sufficient time (t2) to allow capacitor C1 to charge to the threshold level of comparator 184. The signal is reset through comparator 182 by the changing state of signal 6e.

It will be noticed that the received signals include high noise components. These rapid excursions cause the flip flop 186 to remain reset except during the "silent" in-phase portion sensed by the synchronous detector 164.

In use, the microprocessor 100 configures the transducers T1, T2 so that a pulse train of the kind shown in FIG. 6a is sent first in one direction and then in the other. The speed of the gas flowing in measurement section 32 can then be derived from equation (1) above, once compensation has been introduced to take account for fixed time delays for pulses to pass through the electronics and ultrasound transducers.

Referring to FIGS. 7 to 10 and 11a to 11c the gasmeter operating system is made up of foreground and background tasks. The background tasks are carried out under interrupt control, allowing the foreground tasks to operate in the time between interrupts.

BACKGROUND TASKS

Two sources of interrupt are present. The regular polled interrupt (POLL) is set up to cause an interrupt at predetermined intervals, this is used to set up transmit and reception of the ultrasonic pulse according to an interrupt count. (see FIGS. 11a to 11c).

The other source of interrupt is IRQ1 which is set up to interrupt on reception of the received ultrasonic pulse allowing the transit time information to be stored before transmission of the next pulse.

Transit time information is passed between background and foreground tasks, i.e. between the polling routines and the main processing software, by the use of software flags.

FOREGROUND TASKS

Figure 9:
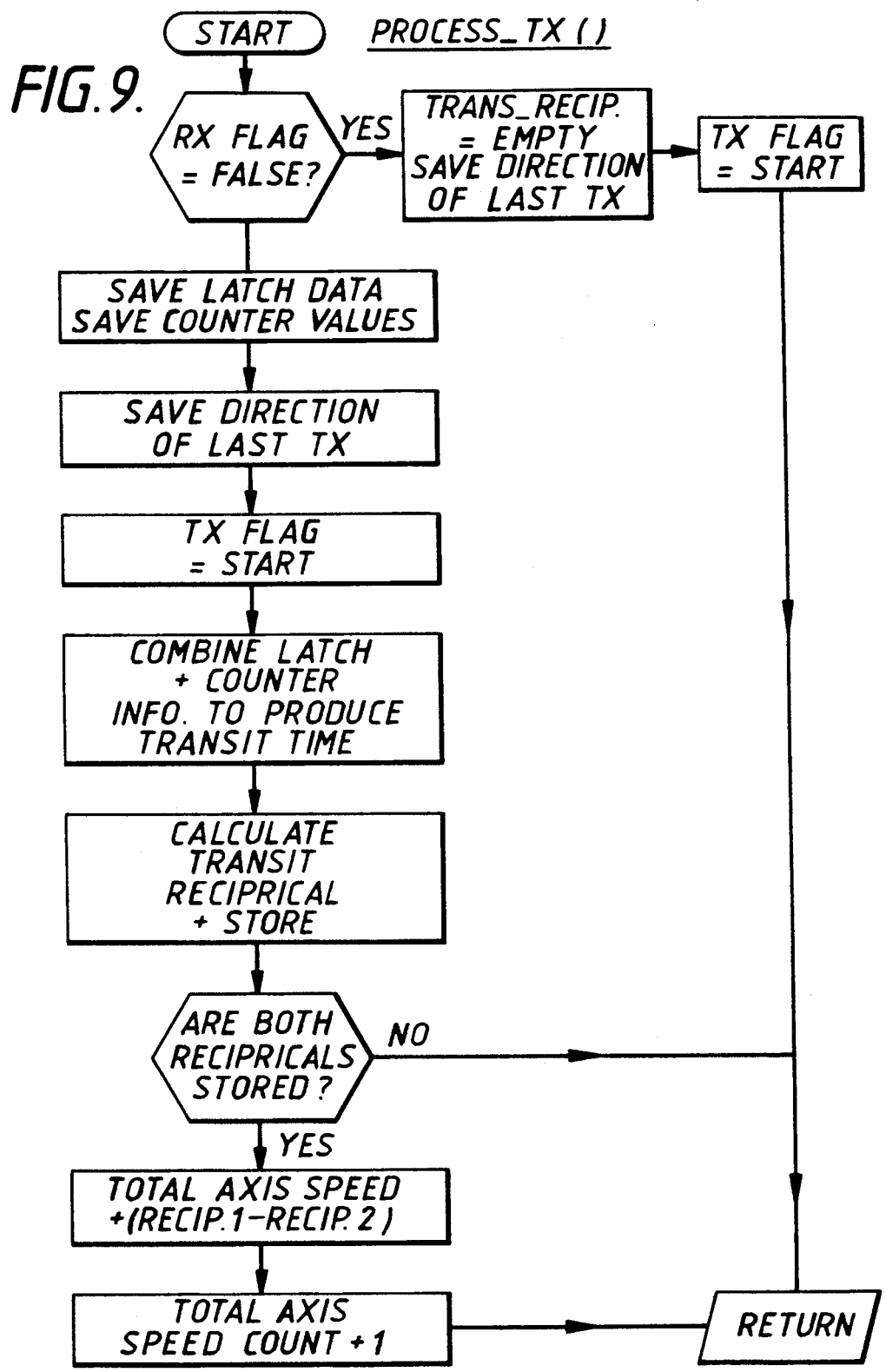
Figure 11B:
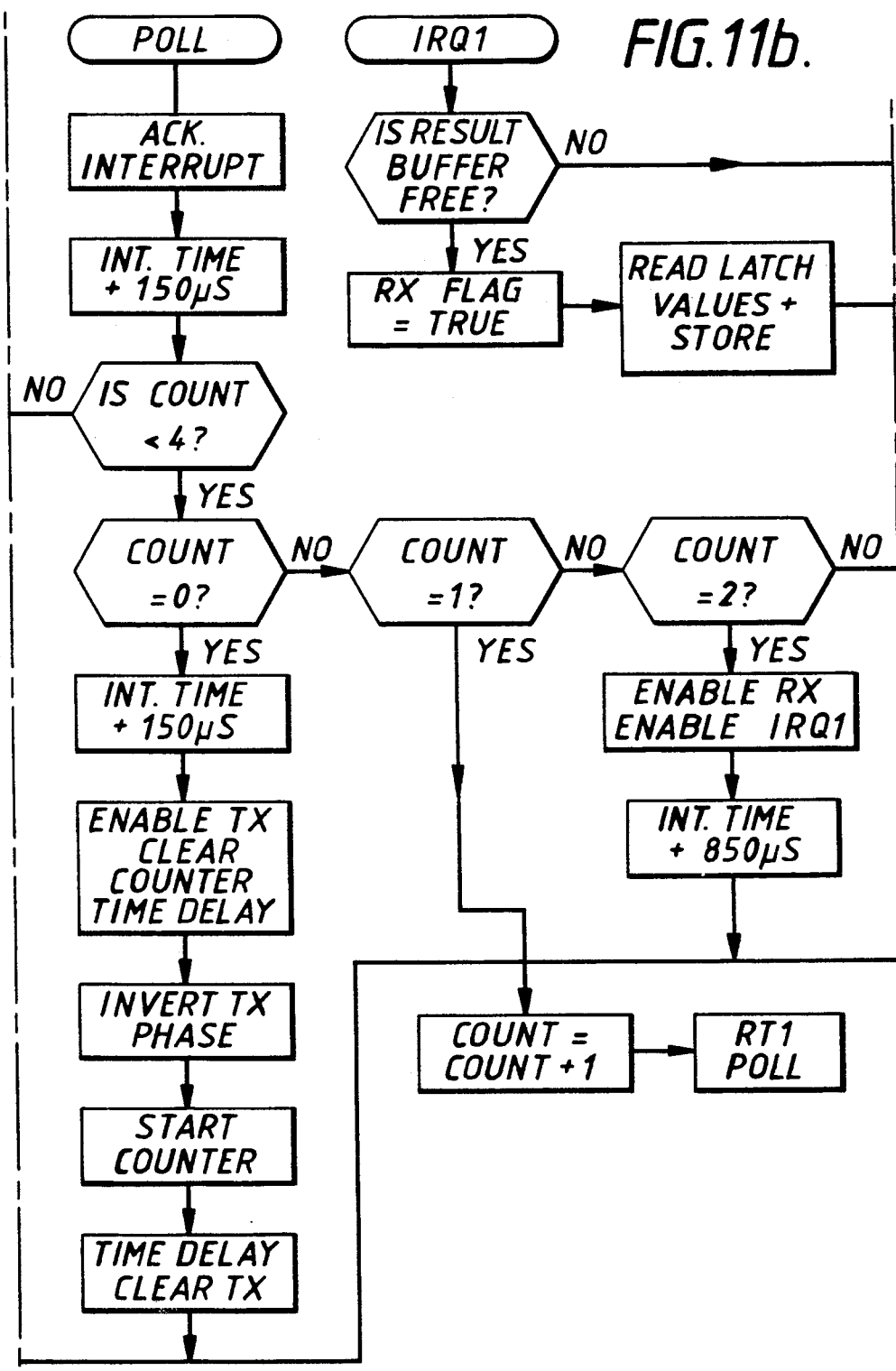

The software normally cycles around the main scan loop (see FIG. 8) until it finds a flag set by the background tasks, every time a pulse is received POLL sets TX-FLAG to FINISHED and the function process-tx is called by the main scan loop (see FIG. 9). Process-tx will resolve an axis speed from the previous pair of pulses and add this into total axis speed. Only when total axis speed count has reached its maximum value does the main scan loop cause the function analyse speed to be called (see FIG. 10). Analyse speed will compute the average axis speed over the period, and the elapsed time since the last calculation is resolved to allow a volume calculation to be made using volume = speed × time × area.

As the gas flow speed is related to volume flow through the measuring section values for gas flow, speed measured at predetermined intervals can be numerically integrated to derive the volume of gas flowing through the measurement section. The relationship between flow speed and flow rate is not linear as the flow profile alters with flow rate. Thus, a velocity dependent co-efficient stored in memory 120 needs to be used in the determination of volume flow. Furthermore, additional sensors for sensing temperature, pressure and humidity may be included in the meter; the microprocessor, through a look-up table in memory 120 compensating for changes in the actual conditions from a set value.

Temperature can be determined as part of the ultrasonic measurements but only for a known gas composition. An independent temperature sensor, however, may comprise a platinum resistance temperature element, the sensor output being periodically sampled by the microprocessor 100. A suitable pressure sensor would be a silicon diaphram sensor with a reference vacuum.

The volume flow and hence gas usage is displayed on display 130 which may be LCD or LED display or, alternatively, an electromechanical totalizing counter. Alternatively, an interface to an interrogating device may be provided instead of or as well as the display 130.

While the identification of the phase change in the received signal performed by the synchronous detectors 164 provides an accurate timing marker for the received signal, in some, particularly high noise, applications further information concerning the received signal my be required. A first modification of the embodiment of FIG. 3, shown in FIG. 12, provides this additional information and comprises a zero cross-over detector 200 which is connected to the output of limitng amplifier 154. Zero cross-over dectector is connected to a clock counter 210 which is in turn connected, via a bus connection 212 to a register stack 220. In use, the zero cross-over detector detects when the signal crosses the level of 50% of its band of excursion and outputs a pulse to clock counter 210. The clock counter 210 then outputs, to register stack 220, a value corresponding to the time at which the cross-over was detected. This operates continuously with the stack 220 being steadily filled from address A1 to address A10, each time reference falling off the end of the stack when it reaches A10. When microprocessor 100 receives the phase change identification signal at input O1, it disables the clock counter 210, reads its current value, which would correspond to the time of the phase change point and then reads the contents of stores A1–A10 which would correspond to the previous zero cross-overs the timing of which would be related to the contents of the clock counter 210 when disabled. This would thus provide information as to the cross-over points of the previous pulses of the received pulse train relative to the phase change point, which are then used as part of a suitable statistical algorithm to establish, more accurately, the time of receipt of the received pulse signal.

After reading the contents of the registers, the microprocessor would re-enable the clock counter and the process would recommence.

As discussed above with reference to FIG. 3, it is necessary for the tuned circuit of phase memory 160 to be tuned exactly to the frequency of the acoustic signal. Factors such as component tolerance means that some tuning and calibration of the tuned circuit 160 or software adjustment to the frequency of the acoustic by microprocessor 100 will generally be required. FIG. 13 shows a modification of the embodiment of FIG. 3 in which the transmitted signal is generated using the phase memory 160, thus obviating the need for such calibration.

Figure 14A:
FIGS. 14a to 14f are a timing diagram for illustrating the operations of the modification shown in FIG. 13.

In FIG. 13, the transmit signal from microprocessor 100 on the O1 line now takes the form of a single pulse of the duration of the pulse train to be transmitted. This signal is fed to a monostable 305, which produces a short pulse (FIG. 14a) which is fed, via an amplifier 310, to a switch 320 which is controlled by microprocessor 100. The switch 320 acts to switch between the receiver circuitry (limiting amplifier 154 of which is shown in phantom lines) and the transmit signal from the microprocessor 100. The selected transmission signal is then fed to the phase memory 160 and limiting amplifier 162. The pulse signal from microprocessor 100 will cause the tuned circuit of the phase memory 160 to ring, as shown, for example in FIG. 14b. Once amplified by amplifier 162 (FIG. 14c), this signal is fed through an exclusive OR gate 330, the output of which (FIG. 14d) is fed to the clock input of a D type flip-flop 340. The other input to the exclusive OR gate 330 is the Q output of the flip-flop 340 (FIG. 14f). The D input of the flip-flop 330 is supplied with a phase invert signal from the microprocessor 100 (FIG. 14e) and the flip-flop supplies a phase trigger output to the microprocessor at the Q output of the flip flop.

Figure 14B:
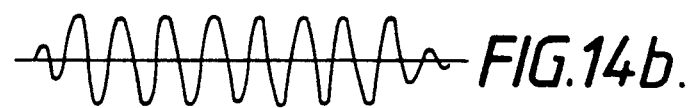
Figure 14C:
Figure 14D:
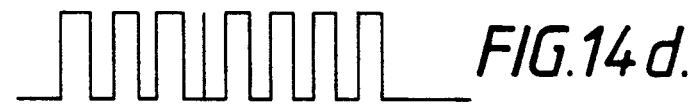
Figure 14E:
Figure 14F:

In use, the pulse from the monostable 305 causes the phase memory circuit ring as shown in FIG. 14b. The output signal from amplifier 162 (FIG. 14c) is then compared with the Q output of flip-flop 340. As the D input to flip-flop 340 is, to start with, low, (FIG. 14e) the Q output is high (FIG. 14f). Therefore, after passing through inverter 345, the signal from amplifier 162 is compared with a constantly low signal and therefore the exclusive OR gate has the function of squaring up the signal to the form shown in the first half of FIG. 14c. At a predetermined time, the phase invert signal is raised to high (FIG. 14e). This causes the Q output of the flip-flop 340 to go low but only after the next rising edge of the output from exclusive OR gate 330 (the clock input to flip-flop 340). When Q goes low, the output from NOT element 345 will go high. This will cause exclusive OR gate 330 to square up the inverse of the signal from amplifier 162, thus causing a change in state of the output of gate 330 almost immediately following the rising edge which caused the Q change of state. This is shown in FIG. 14d as a noise spike at this point of 180° phase change.

The output Q, which is complementary to Q, provides a timing marker for the transmitted signal, identifying the point of the phase change, for input to the processor and high speed counter.

Once the above embodiment has been described with reference to a sensor for measuring the speed of flow of a gas and thus the volume flow thereof through a measurement section of known dimensions, the invention is equally applicable for measuring the flow speed of gases and liquids in other applications, for example those mentioned in the prior art specifications referred to at the start of this specification.

Furthermore, while the transmitting and receiving circuits have used a 180° phase change in the transmitted signal as a timing marker, other phase changes, and appropriate receiving circuitry, can be used, as will be apparent to those skilled in the art.

What is claimed is:

1. A fluid speed measuring apparatus comprising:
   first and second spaced transducer means;
   transmitter and receiver means for transmitting and receiving signals in both directions between said transducer means, the transmitter means being arranged to generate a tone burst singal including a first burst portion and a second burst portion, the second portion being of a different phase relationship to the first portion so as to provide a timing marker at the point of phase change therebetween and said receiver means being arranged to sense said phase change to determine the presence of the timing marker on the received signal.

2. Apparatus as claimed in claim 1 in which the tone burst signal comprises a series of pulses forming the first and second burst portions with at least one of the pulses having a different phase to that of the remaining pulses so as to provide a timing marker at the point of phase change therebetween, and means for determining fluid speed from information derived from the receiver means.

3. Apparatus as claimed in claim 2, wherein the means for determining speed comprises:
   counter means for counting the period between a generated pulse of different phase and a received pulse of different phase; and
   converter means for converting the transit time thereof into the fluid speed.

4. Apparatus as claimed in claim 3, wherein the converter means is configured to convert fluid speed into flow rate for metering purposes.

5. Apparatus as claimed in claim 2, wherein the speed determining means comprises:
   a microprocessor; and
   display means to give a visual indication of the results therefrom.

6. Apparatus as claimed in claim 5, wherein the microprocessor includes a memory for storing velocity dependent coefficients for correcting non-linear relationships between fluid speed and flow rate.

7. Apparatus as claimed in claim 1, wherein the transmitter means includes means for switching pulse inputs to the first and second transducer means and the receiver means inlcudes means for switching from the first and second transducer means whereby the transducer means are alternately used for transmission and reception of the signals passed between the spaced transducer means.

8. Apparatus as claimed in claim 1 wherein the receiver means comprises:

shaping means for substantially restoring the shape of the signals transmitted;

delay means for delaying the restored signals; and detector means for detecting the phase relationship between the delayed and undelayed signal to provide an output dependent on their phase relationship.

9. Apparatus as claimed in claim 8, wherein the detector means includes a bistable device continually resettable except during a period of in-phase detection.

10. Apparatus as claimed in claim 2 including means for sensing temperature, pressure and/or humidity for allowing the determining means to modify computation in dependence on the sensing means.

11. Apparatus as claimed in claim 2, wherein interfacing means are provided for allowing remote interrogation of the determined fluid speed information.

12. Apparatus as claimed in claim 1 or claim 2, wherein the transducer means each comprise a piezoelectric device having faces configured to have acoustic compatibility with the fluid and are located in a duct to provide an acoustic path parallel to a path taken by the fluid.

13. Apparatus as claimed in claim 12, wherein means are provided to speed up the fluid in the region between the spaced transducer means.

14. Apparatus as claimed in any one of claims 1, 2 or 7-11 wherein means are provided to speed up the fluid in the region between the spaced transducer means.

15. A method of measuring fluid speed comprising the steps of:

generating a tone burst signal including a first burst portion and a second burst portion, the second portion being of a different phase relationship to the first portion so as to provide a timing marker at the point of phase change therebetween;

transmitting and receiving the tone burst signal in both directions between spaced transducers in a fluid path and sensing said phase change in the received tone burst signal to determine the presence of the timing marker on the received tone burst signal.

16. A method as claimed in claim 15 wherein the tone burst signal comprises a series of pulses forming first and second burst portions with at least one of the pulses having a different phase to that of the remaining pulses so as to provide the timing marker at the point of phase change therebetween, and the fluid speed is determined from information derived from the timing marker on the received signals.

17. A method as claimed in claims 15 or 16, wherein the transmitting step includes switching inputs to spaced transducers and the receiving step includes switching from the spaced transducers whereby the transducers are alternately used for transmission and reception of the signals passed therebetween.

18. A method as claimed in claims 15 or 16 wherein the receiving step comprises the steps of:

substantially restoring the shape of the signals transmitted on reception;

delaying the restored signals; and detecting the phase relationship between the delayed and undelayed signals to provide an output dependent on their phase relationship.

19. A method as claimed in claims 15 or 16, wherein a fluid speed determining step includes counting the period between a generated burst portion of different phase to the remainder and the timing marker on the received tone burst signal and converting the transit time thereof into the fluid speed.

20. A method as claimed in claim 19 including converting fluid speed into flow rate for metering purposes.

21. A method as claimed in claims 15 or 16 including determining fluid speed and providing visual indication of the fluid speed.

22. A method as claimed in claims 15 or 16, including storing velocity dependent coefficients for correcting non-linear relationships between fluid speed and flow rate.

23. A method as claimed in claims 15 or 16, including sensing temperature, pressure and/or humidity for allowing a fluid speed determining step thereafter to modify computation in dependence on sensed information.

24. A method as claimed in claims 15 or 16 including speeding up the fluid flow in the region between the spaced transducers.

25. Apparatus for measuring the volume flow of a fluid flowing through a duct and comprising:

first and second transducer means disposed in the duct and spaced one from the other to define an acoustic path therebetween, the first and second transducer means being arranged to transmit and receive acoustic signals in both directions along the acoustic path; and means arranged to increase the flow speed of the fluid in the duct in the region of and along the acoustic path, wherein the means for increasing speed includes a venturi device, and the venturi device is configured towards one end of a flow shaping member, said member also including a measurement section configured to maintain flow speed and adjacent one end of which one of the transducer means is mounted, the other transducer means being mounted in the region of the venturi device.

26. Apparatus as claimed in claim 25 wherein the measurement section includes an increasing diameter portion to compensate for viscous effects to ensure speed is maintained.

27. Apparatus as claimed in claim 26, wherein one transducer is mounted on a sleeve having a winged portion.

28. Apparatus as claimed in claim 25 wherein filter means are provided to settle flow.

29. Apparatus as claimed in claim 28 wherein the filter is annular and of gauze construction.

30. Apparatus as claimed in claim 25 wherein generator means are provided to generate the signals in the form of a series of pulses, at least one of which has a different phase to the remainder and means are provided for calculating the flow using the generated signals.

31. Apparatus as claimed in claims 25 or 26 wherein the flow shaping member includes a settling chamber for allowing turbulence to be substantially reduced prior to measurement.

32. Apparatus for measuring the volume flow of a fluid through a duct and comprising: a settling chamber within the duct to reduce turbulence of the fluid, a conduit within the duct arranged coaxially of the settling chamber and configured to increase the fluid speed therethrough, first and second transducer means disposed in the duct and arranged to transmit and receive acoustic signals along the fluid flow path in the conduit; and means for switching the direction of transmission of the acoustic signals so that the acoustic path is alternately with and against the fluid flow direction, and wherein the conduit terminates at each end with an internal diameter greater than that of the remainder of the conduit and the conduit includes a portion, the external diameter of which is greater than the remainder to reduce the available fluid path area within the duct coaxial therewith.

* * * * *